United States Patent Office 3,479,263
Patented Nov. 18, 1969

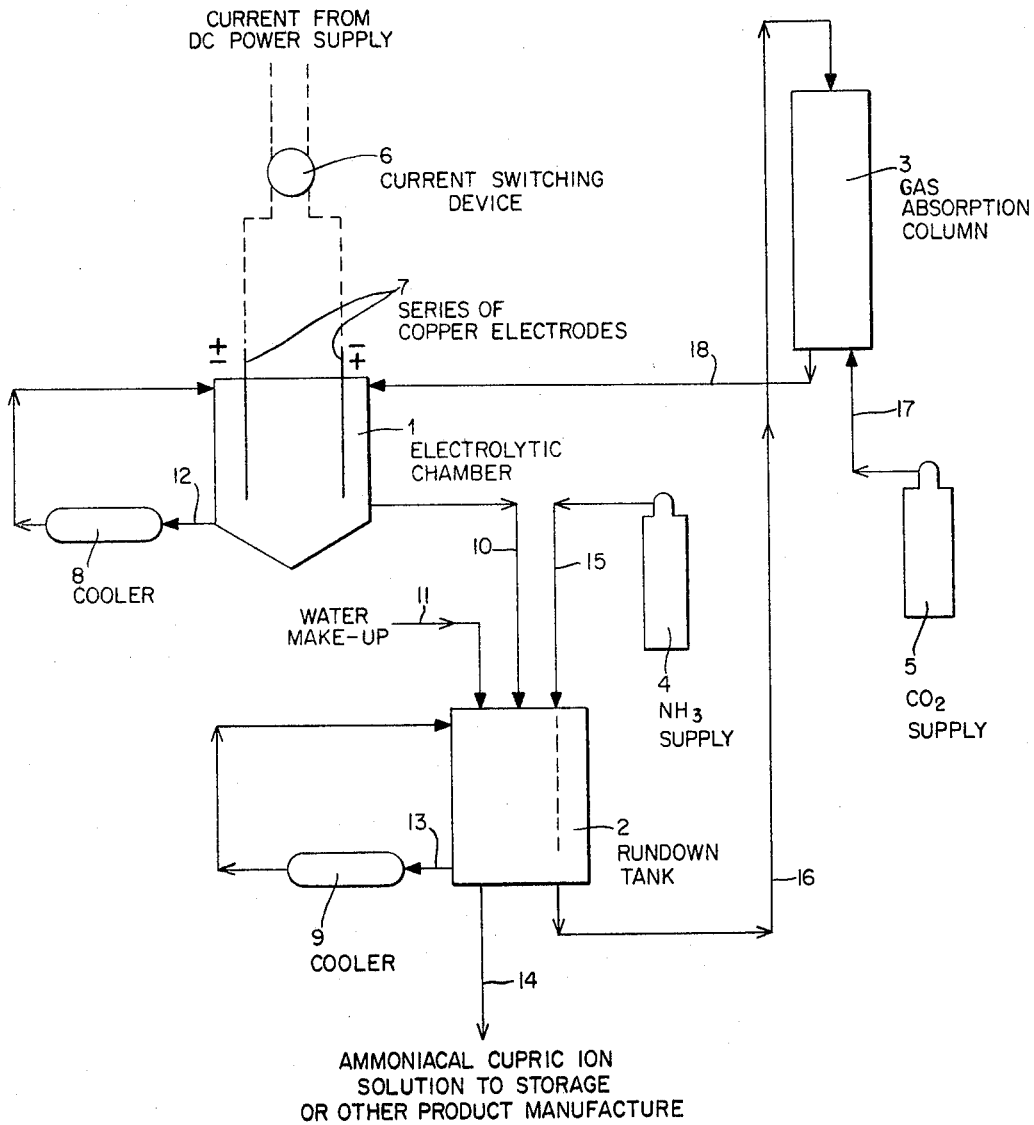

3,479,263
ELECTROLYTIC PROCESS FOR PREPARING AN AQUEOUS AMMONIACAL SOLUTION OF CUPRIC ION
Joseph B. Heitman, Pierce, Wash., assignor to Pennsalt Chemicals Corporation, Philadelphia, Pa., a corporation of Pennsylvania
Filed Apr. 12, 1967, Ser. No. 630,423
Int. Cl. B01k 1/00
U.S. Cl. 204—86                                6 Claims

ABSTRACT OF THE DISCLOSURE

An aqueous ammoniacal solution of cupric ion is prepared electrolytically by passing a direct current between copper electrodes through an electrolyte having a temperature of 5° C. to 25° C. consisting essentially of an aqueous solution containing about 80 to 200 grams per liter of ammonia and 65 to about 130 grams per liter of carbon dioxide, and reversing the polarity of the current every 10 to 600 seconds.

---

This invention relates to an electrolytic method of preparing an aqueous ammoniacal solution of cupric ion. More particularly, this invention concerns a process for the electrolytic production of cupric ion in aqueous ammoniacal solution which comprises passing a direct current between copper electrodes, wherein the polarity of the current is reversed at intervals of from about 10 to about 600 seconds, through an electrolyte consisting essentially of an aqueous solution containing from about 80 to 200 grams per liter of ammonia and from 65 to about 130 grams per liter of carbon dioxide, said electrolyte having a temperature within the range of about 5° C. to about 25° C.

The aqueous ammoniacal cupric ion solution prepared in accordance with this invention is useful for the preparation of contaminant-free cupric hydroxide by precipitation therefrom with caustic, and for the preparation of other copper salts and compounds. However, the most important use for the product of this invention is in the preparation of aqueous ammoniacal copper arsenite solution, a widely used wood preservative, which as usually applied has a composition of the following ranges of components, stated in grams of ingredients per liter of solution.

Cupric ion _____ 40–120
Arsenic trioxide _____ 34–103
Acetic acid _____ 1.4–4.2
Ammonia _____ 96–320

A typical commercial formulation is

G.p.l.
Cupric ion _____ 66
Arsenic trioxide _____ 58
Acetic acid _____ 2.4
Ammonia _____ 192

Heretofore, the cupric ion constituent of the aforesaid aqueous ammoniacal copper arsenite solution formulations has been supplied by mixing solid cupric hydroxide with the other ingredients in aqueous solution. Solid cupric hydroxide is a relatively expensive compound which is produced in particle sizes ranging from a blue gel up to finely-divided solids such as sandlike particles and light, fluffy, powdery materials, depending on the mode of preparation, all forms of which are characterized by the usual difficulties involved in handling finely-divided solid materials. Some forms of cupric hydroxide are stable and may be stored for years; other forms are unstable and may dehydrate to cupric oxide in a matter of days, the decomposition being catalyzed by the presence of cupric oxide. One process for the manufacture of cupric hydroxide (U.S. 1,800,828) consists of adding ammonia to a copper sulfate solution to form cuprous ammonium sulfate solution, which is then filtered to remove insoluble impurities and treated with a slight excess of caustic soda to precipitate cupric hydroxide which is filtered off, washed, and dried. In another process (U.S. 2,666,-688), solutions of copper sulfate and caustic soda are added simultaneously to a solution of trisodium phosphate and copper sulfate. The precipitated cupric hydroxide is recovered by filtration. In another process (U.S. 2,525,242), copper is dissolved in an ammonium carbonate solution and oxygen or air is bubbled therethrough until the copper is converted to the cupric state; the resulting aqueous solution of cupric ammonium carbonate contains 50 to 100 grams per liter of Cu, 31 to 63 grams per liter of $CO_2$ and 47 to 95 grams per liter of $NH_3$. Said solution is added to an aqueous solution of NaOH at 100° F. to 120° F., and cupric hydroxide is precipitated and recovered as a light fluffy powder. In an early electrolytic process (U.S. 1,855,141), copper hydrate, oxide, or carbonate is recovered as fine flake or snow from the bottom of the electrolytic cell in which the electrolyte consists of water containing dissolved carbon dioxide and about 4% of sodium chlorate, chloride, or nitrate as a catalyst. In a more recently disclosed electrolytic method (U.S. 3,194,749), direct current is passed through an electrolyte between a copper anode and an inert cathode, said electrolyte having a pH about 9 and consisting essentially of an aqueous solution of sodium sulfate and trisodium phosphate. The cupric hydroxide product precipitates in the cell as a finely-divided solid and is recovered by filtration of the electrolyte.

The present invention involves a highly efficient electrolytic method for producing cupric ion in aqueous ammoniacal solution. The solution can advantageously be utilized without separate recovery of the copper value in the preparation of the aforementioned aqueous ammoniacal copper arsenite wood preservative solution by mixing therewith the appropriate amounts of arsenic trioxide and acetic acid and, if required, some additional ammonia. The electrolytic method of this invention has many advantages over the non-electrolytic process for preparing cupric ammonium carbonate as described in U.S. 2,525,242. Said non-electrolytic method involves oxidation of the copper by bubbling air or oxygen into the ammonium carbonate solution, which operation results in a loss of ammonia and carbon dioxide or recovery expenses. The non-electrolytic process is a very slow reaction, and in order to obtain a practical rate of reaction, expensive copper powder should be used. The present process, on the other hand, involves a rapid, easily controlled reaction (i.e., controlled by current input) which utilizes easily handled massive pieces of copper, preferably copper refinery cathode sheets. It is necessary, however, to maintain specific, relatively high levels of carbon dioxide and ammonia in the electrolyte solution, as discussed more fully hereinbelow, to achieve good results according to the present invention, wherein direct current is passed between copper electrodes through an electrolyte consisting essentially of an aqueous solution containing from about 80 to about 200 grams per liter (g.p.l.) of ammonia and from 65 to about 130 g.p.l. of carbon dioxide, the temperature of said electrolyte ranging from about 5° C. to about 25° C. The current is reversed, that is, the polarity of the electrodes is switched, at intervals of from about 10 to about 600 seconds.

Referring now to the attached drawing in which a diagramatic flow sheet depicting a specific embodiment of the process is shown, an electrolytic chamber 1 is provided with a series of copper electrodes 7 which are supplied with direct current from a power source, the current passing through a polarity switching device 6. The electrolyte (containing dissolved $NH_3$, $CO_2$ and, after electrolysis has begun, cupric ion) passes via line 12 through cooler 8 which maintains the electrolyte at the required temperature. The cooler 8 may be any conventional heat exchanger suitable for removing the heat of electrolysis and regulating the reaction temperature. The electrolyte passes from the electrolytic chamber through line 10 to rundown tank 2. The ammonia requirements for the electrolyte are fed from ammonia storage tank 4 through line 15 which injects the ammonia into the rundown tank below the liquid level. The solution is recirculated by line 13 through cooler 9 to remove heat generated by the ammonia solvation and to help maintain the solution near the desired system electrolyte temperatures. A portion of the ammoniacal cupric ion solution is continuously withdrawn from the rundown tank as product through line 14. A portion of the solution passes from the rundown tank through line 16 to gas absorption column 3. Carbon dioxide requirements are supplied from $CO_2$ tank 5 through line 17 which passes into the absorption column 3. The column is packed with Intalox saddles, Raschig rings or like packing material to promote $CO_2$ absorption by the electrolyte. The electrolyte is recirculated from the column through line 18 back to the electrolytic chamber. Fresh make-up water is added to the rundown tank through line 11 to balance the solution volume removed as product and to maintain the proper electrolyte level in the cell. While the above-described embodiment refers to a continuous process for practising the invention, it is to be understood that batch operation is also contemplated. Moreover, many variations and modifications in the auxiliary equipment of the system will be obvious to and may be made by those skilled in the art without departing from the scope and spirit of this invention. For example, it is possible to maintain the proper heat balance and temperatures in the system with a single heat exchanger located in line 18. There are also several alternative methods and locations by which the gases can be charged to the electrolyte.

Certain aspects and limitations of the constituency of the electrolyte and operating conditions of the cell are essential and critical for the proper and efficient operation of the process of this invention. As mentioned above, the ammonia concentration in the electrolyte is at least about 80 g.p.l. and may be as high as about 200 g.p.l. If the $NH_3$ concentration falls below the minimum, some cupric ion product will precipitate from solution as finely-divided cupric hydroxide, and, in addition, the current efficiency decreases as the $NH_3$ concentration drops below the desired levels. The carbon dioxide content of the electrolyte is at least about 65 g.p.l. and may be as high as about 130 g.p.l. The desirable concentrations of both the ammonia and carbon dioxide is a function of the cupric ion concentration in the electrolyte. For example, in the case of a batch operation starting with zero cupric ion concentration in the electrolyte, the ammonia concentration may be in the range of about 80 to 100 g.p.l. and the carbon dioxide concentration in the range of about 65 to 80 g.p.l. However, as the cupric ion content of the liquor is increased by the electrolysis reaction, for instance, up to about 70 g.p.l. of cupric ion, the concentrations of the two dissolved gases must be raised to the vicinity of about 150 g.p.l. of ammonia and about 110 g.p.l. of carbon dioxide. The electrolysis reaction generally is continued until, in a batch operation (and, similarly, in a continuous operation, product generally is not withdrawn until), the concentration of cupric ion in the electrolyte is at least within the range of about 60 to 70 g.p.l. However, if it is desired to prepare solutions having a cupric ion concentration of over 70 g.p.l., a corresponding upward adjustment of the gas concentrations must be made. Failure to increase the gas concentrations as the cupric ion content increases results in decreased current efficiencies. The preferred ammonia concentrations, in general, range from about 100 to 150 g.p.l., and the preferred carbon dioxide concentrations are in the range of about 80 to 110 g.p.l., depending on the cupric ion concentration as discussed above. (It is to be understood that the terms "dissolved ammonia" and "dissolved carbon dioxide" and like terms as used herein to refer to the $NH_3$ and $CO_2$ contents of the electrolyte solution also include the ammonia and carbon dioxide components which are present as dissolved ammonium carbonate.) When the gas concentrations are within the ranges specified as essential herein, taking cupric ion concentration into account, the current efficiency in the electrolysis is from about 80% to 90%. When the gas concentrations are less than indicated, the current efficiency drops below about 40% whereupon the process becomes commercially impractical; moreover, a considerable lowering of the gas concentrations causes the electrolytic reaction embodied herein to be essentially terminated.

It has been found that the temperature at which the electrolysis is carried out should be within the range of about 5° C. to about 25° C., preferably 10° C. to 20° C. It is essential that the temperature be controlled within said limits to obtain high current efficiencies, i.e., from about 80% to 90%. Temperatures much below the preferred values are expensive to maintain and higher temperatures result in excessive ammonia loss and a drop in current efficiency.

In the practice of this invention, the voltage applied is not critical and may range from about 3 to 6 volts and for best results, 4 to 5 volts are used. The amperage applied also is not critical. However, for best results, current densities of from about 55 to about 120 amperes per square foot of electrode surface are preferred.

The copper electrodes employed in the process may be in any convenient massive form, e.g., rods, bars, etc. Preferred, however, are sheets of copper about ¼ to one inch thick. Direct current is supplied to the electrodes; it has been found that alternating current is inoperable. As mentioned previously, periodic current reversal during electrolysis is necessary, e.g., every 10 to 600 seconds, and preferably at intervals of 20 to 40 seconds. The current reversal is accomplished with a conventional switching device, for example, a system of mechanical circuit breakers actuated by a clockwork timing mechanism, or an electronic switching device based on silicon controlled rectifiers. The reason for the periodic current reversal is as follows: As the electrolysis reaction is carried out, there is some plating of copper on the faces of the electrodes. The plate is dendritic in nature and sloughs off the plates and settles to the bottom of the cell chamber as copper powder. (For this reason a cell chamber having a cone-shaped bottom is desirable, in which free space the copper powder can collect and then infrequently be removed.) The periodic current reversal as herein described is essential to keep the dendritic copper loss to a minimum and, ordinarily, operation at the preferred intervals keeps the plate-out to less than about 0.3% of the total amount of the copper electrodes consumed in the electrolysis.

The following illustrative examples are set forth to clarify the invention and to demonstrate the effect of the electrolyte composition on the results of the process. Six supported copper electrodes were placed in an electrolytic chamber 4½" x 9" x 11" deep. The electrodes were copper sheet 4" x 11.25" x ½" thick. The electrical connections were attached only to the outer electrodes so that the entire unit was equivalent to five cells of the bipolar type. Electrolyte solution from the cell discharged into a ten gallon rundown tank into which the ammonia was supplied as a gas from a cylinder. The electrolyte was pumped from the rundown tank through a water cooled heat exchanger and into the top of a 1½" diameter x 4 foot column packed with ½ inch Intalox saddles. Carbon dioxide was injected into the base of the column. The electrolyte solution flowed from the bottom of the column and was returned to the electrolytic chamber. The flow rate of the circulated electrolyte was about 0.5 liter per minute per liter of liquid in the electrolytic cell. The copper ion was zero at the start. The data from five representative runs are summarized below.

| Example No. | 1 | 2 | 3 | 4 | 5 |
|---|---|---|---|---|---|
| Cell potential, avg. volts/cell | 4.0 | 4.0 | 4.1 | 4.7 | 4.3 |
| Cell current, avg., amps | 22.9 | 29.2 | 20 | 20 | 19.9 |
| Current reversal interval, seconds | | | | | |
| $NH_3$ content of electrolyte, g.p.l.: | 30 | 30 | 300 | 30 | 30 |
| Start | 61 | 36 | 30 | 123 | 93 |
| Finish | 135 | 111 | 98 | 155 | 161 |
| $CO_2$ content of electrolyte, g.p.l.: | | | | | |
| Start | 28 | 40 | 0 | 102 | 0 |
| Finish | 117 | 112 | 95 | 109 | 104 |
| Average | 84 | 71 | 57 | 91 | 91 |
| Temperature of electrolysis, avg., °C | 18 | 23 | 20 | 17 | 17 |
| Cupric ion content of product, g.p.l. | 18.4 | 25.7 | 26.6 | 70.6 | 64.9 |
| Current efficiency, percent | 47.2 | 27.3 | 47.9 | 86.2 | 89.0 |

It is noted that in Examples 1, 2 and 3, the current efficiencies were minimal, largely because of the low gas concentrations in the electrolyte. It was observed in carrying out Examples 4 and 5 that when the $CO_2$ content of the electrolyte was permitted to drop to 60 g.p.l., the current efficiency approached zero; when the $CO_2$ content was raised to 85 g.p.l., the current efficiency increased to over 80%.

Analyses of the ammoniacal cupric ion solutions produced in the foregoing examples indicated that all of the copper in the solution was in the cupric state of oxidation.

It is to be understood that the foregoing examples are presented for the purpose of illustrating the invention and should not be construed to limit the scope thereof as defined by the appended claims.

I claim:
1. The method of preparing an aqueous ammoniacal solution of cupric ion which comprises passing a direct current between copper electrodes through an electrolyte having a temperature of from about 5° C. to about 25° C. consisting essentially of an aqueous solution containing from about 80 to about 200 grams per liter of ammonia and from about 65 to about 130 grams per liter of carbon dioxide, the polarity of the current to the electrodes being reversed at intervals of from about 10 to about 600 seconds.

2. The method according to claim 1 wherein the current is reversed at intervals of about 20 to 40 seconds.

3. The method according to claim 1 wherein the temperature of the electrolyte is from about 10° C. to about 20° C.

4. The method according to claim 1 wherein the ammonia concentration in the electrolyte is from about 100 to about 150 grams per liter and the carbon dioxide concentration in the electrolyte is from about 80 to about 110 grams per liter.

5. The method according to claim 4 wherein the current is reversed at intervals of about 20 to 40 seconds.

6. The method according to claim 4 wherein the temperature of the electrolyte is from about 10° C. to about 20° C.

References Cited

UNITED STATES PATENTS 2,965,438  12/1960  Mullen _____ 23—55 XR

JOHN H. MACK, Primary Examiner

D. R. JORDAN, Assistant Examiner

U.S. Cl. X.R.
23—55; 204—102